United States Patent
Jung et al.

(10) Patent No.: US 8,003,252 B2
(45) Date of Patent: Aug. 23, 2011

(54) ELECTRODE FOR RECHARGEABLE LITHIUM BATTERY AND RECHARGEABLE LITHIUM BATTERY INCLUDING SAME

(75) Inventors: Euy-Young Jung, Yongin-si (KR); Duck-Chul Hwang, Yongin-si (KR); Yong-Chul Park, Yongin-si (KR); Jeom-Soo Kim, Yongin-si (KR); Jong-Hwa Lee, Yongin-si (KR); Jae-Yul Ryu, Yongin-si (KR); So-Hyun Hur, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 829 days.

(21) Appl. No.: 11/751,958

(22) Filed: May 22, 2007

(65) Prior Publication Data

US 2008/0248396 A1 Oct. 9, 2008

(30) Foreign Application Priority Data

Apr. 5, 2007 (KR) ................ 10-2007-0033744

(51) Int. Cl.
*H01M 4/02* (2006.01)

(52) U.S. Cl. ............... 429/209; 429/231.95; 429/231.1; 429/231.2; 429/231.3; 429/231.5; 429/223; 429/217; 427/58; 427/126.3; 427/126.4; 427/126.6; 252/182.1

(58) Field of Classification Search ............ 429/209, 429/231.95, 231.1, 231.3, 231.2, 231.5, 223, 429/217; 427/58, 126.3, 126.4, 126.6; 252/182.1
See application file for complete search history.

(56) References Cited

U.S. PATENT DOCUMENTS

| | | | |
|---|---|---|---|
| 7,326,498 B2 * | 2/2008 | Park et al. | 429/231.1 |
| 7,682,740 B2 * | 3/2010 | Yong et al. | 429/217 |
| 2005/0118511 A1 * | 6/2005 | Park et al. | 429/231.1 |
| 2005/0266150 A1 * | 12/2005 | Yong et al. | 427/58 |
| 2006/0024584 A1 | 2/2006 | Kim et al. | |
| 2007/0231705 A1 | 10/2007 | Ohzuku et al. | |

FOREIGN PATENT DOCUMENTS

| | | |
|---|---|---|
| JP | 2002-216753 | 8/2002 |
| KR | 10-2000-0073252 | 12/2000 |
| KR | 10-2001-0104150 | 11/2001 |
| KR | 10-2002-0007618 | 1/2002 |
| KR | 10-2002-0029813 | 4/2002 |
| KR | 2006-41649 | 5/2006 |

* cited by examiner

*Primary Examiner* — Laura S Weiner

(74) *Attorney, Agent, or Firm* — Christie, Parker & Hale, LLP

(57) ABSTRACT

An electrode, for a rechargeable lithium battery, including a current collector; an active material layer disposed on the current collector; and a coating layer disposed on the active material layer. The coating layer includes a lithium ion conductive polymer and an inorganic material represented by Formula 1: $M_wH_xP_yO_z$, wherein M is an element selected from the group consisting of an alkali metal, an alkaline-earth metal, a Group 13 element, a Group 14 element, a transition element, a rare earth element, and a combination thereof; and $1 \leq w \leq 4$, $0 \leq x \leq 4$, $1 \leq y \leq 7$, and $2 \leq z \leq 30$.

33 Claims, 2 Drawing Sheets

ELECTRODE FOR RECHARGEABLE LITHIUM BATTERY AND RECHARGEABLE LITHIUM BATTERY INCLUDING SAME

CROSS-REFERENCE TO RELATED APPLICATIONS

This application claims the benefit of Korean Application No. 2007-33744, filed Apr. 5, 2007, in the Korean Intellectual Property Office, the disclosure of which is incorporated herein by reference.

BACKGROUND OF THE INVENTION

1. Field of the Invention

Aspects of the present invention relate to an electrode for a rechargeable lithium battery and a rechargeable lithium battery including the same.

2. Description of the Related Art

Lithium rechargeable batteries have recently drawn attention as power sources for small portable electronic devices. Lithium rechargeable batteries use an organic electrolyte solution and have a discharge voltage that is twice as high as conventional alkali batteries. Lithium rechargeable batteries accordingly have high energy densities.

Positive active materials of rechargeable lithium batteries include lithium-transition element composite oxides capable of intercalating lithium, such as, $LiCoO_2$, $LiMn_2O_4$, $LiNiO_2$, $LiNi_{1-x}Co_xO_2$ ($0<x<1$), $LiMnO_2$, and the like. Rechargeable lithium batteries include negative active materials, for example, various carbon-based materials, such as, artificial graphite, natural graphite, and hard carbon all of which may intercalate and deintercalate lithium ions.

The positive and negative electrodes of rechargeable lithium batteries may be unstable, depending on a charge state, at a temperature of 25° C. or more. The instability can result from the decomposition of an electrolyte salt, an organic solvent, and/or positive and negative active materials. This decomposition causes serious deterioration of battery stability and safety.

Therefore, it is difficult to satisfy consumers, who require a high-capacity battery having high levels of stability and safety.

SUMMARY OF THE INVENTION

Various embodiments of the present invention provide an electrode for a rechargeable lithium battery having excellent safety, thermal stability, and cycle-life. Other aspects of the present invention provide a rechargeable lithium battery including such an electrode.

According to aspects of the present invention, provided is an electrode for a rechargeable lithium battery that includes a current collector; an active material layer disposed on the current collector, and a coating layer disposed on the active material layer. The coating layer can include a lithium ion conductive polymer and an inorganic material represented by Formula 1: $M_wH_xP_yO_z$.

In Formula 1, M is an element selected from the group consisting of an alkali metal, an alkaline earth metal, a Group 13 element, a Group 14 element, a transition element, a rare earth element, and a combination thereof, with $1 \leq w \leq 4$, $0 \leq x \leq 4$, $1 \leq y \leq 7$, and $2 \leq z \leq 30$.

The electrode may be used as a positive electrode and/or a negative electrode. The inorganic material can be selected from the group consisting of $Mg_2P_2O_7$, $AlPO_4$, and a combination thereof.

The lithium ion conductive polymer can be selected from the group consisting of polyvinylidene fluoride, a copolymer of polyvinylidene fluoride and hexafluoropropylene, poly(vinylacetate), poly(vinyl butyral-co-vinyl alcohol-co-vinyl acetate), poly(methylmethacrylate-co-ethyl acrylate), polyacrylonitrile, polyvinylchloride-co-vinyl acetate, polyvinyl alcohol, poly(1-vinylpyrrolidone-co-vinyl acetate), cellulose acetate, polyvinyl pyrrolidone, polyacrylate, polymethacrylate, polyolefins, polyurethanes, polyvinylethers, acrylonitrile-butadiene rubber, styrene-butadiene rubber, acrylonitrile-butadiene-styrene, a sulfonated styrene/ethylene-butylene/styrene triblock polymer, polyethylene oxide, polytetrafluoroethylene, a copolymer of polytetrafluoroethylene and hexafluoropropylene, and a combination thereof. The lithium ion conductive polymer can be selected from the group consisting of polyvinylidene fluoride, a copolymer of polyvinylidene fluoride and hexafluoropropylene, and a combination thereof may be appropriate.

The coating layer can have a thickness ranging from 0.1 to 30 μm. According to some embodiments, the coating layer can have a thickness ranging from 0.5 to 20 μm.

According to various embodiments, provided is a rechargeable lithium battery including a positive electrode, a negative electrode, and an electrolyte including a non-aqueous organic solvent and a lithium salt. At least one of the positive and negative electrodes is the above described electrode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
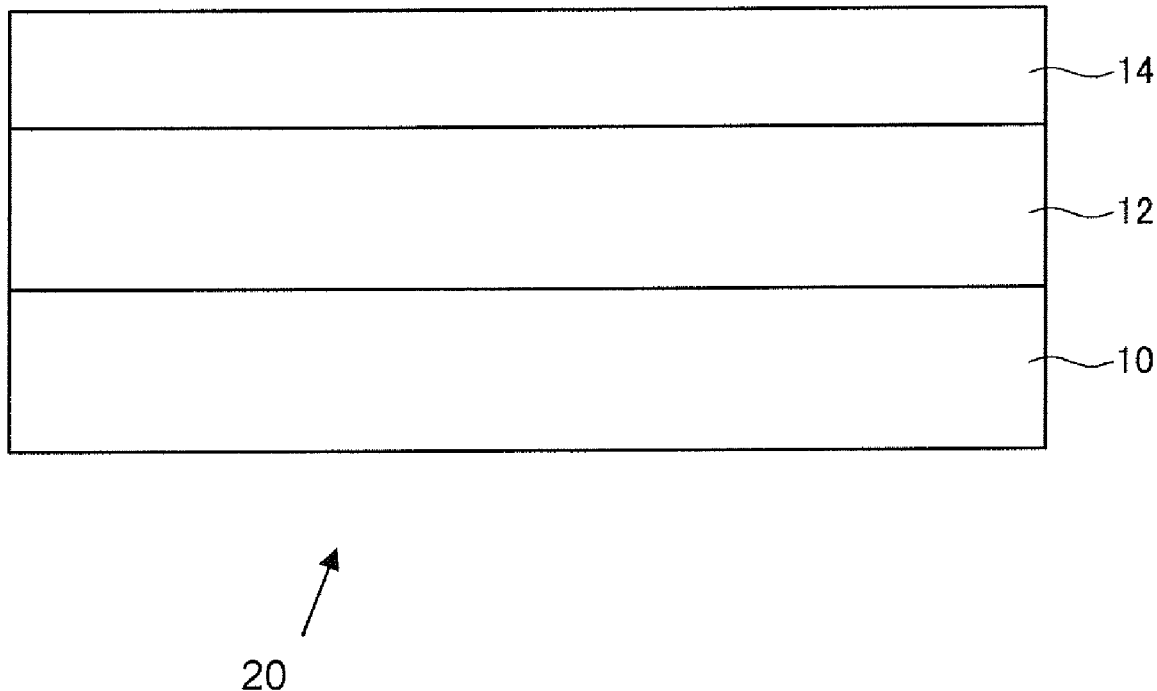
FIG. 1 is schematic view of an electrode for a rechargeable lithium battery, according to various embodiments of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention relate to an electrode for a rechargeable lithium battery having excellent safety, thermal stability, and cycle-life. The electrode includes a current collector; an active material layer disposed on the current collector, and a coating layer disposed on the active material layer. The coating can include a lithium ion conductive polymer and an inorganic material represented by Formula 1: $M_wH_xP_yO_z$. In Formula 1, M is an element selected from the group consisting of an alkali metal, an alkaline-earth metal, a Group 13 element, a Group 14 element, a transition element, a rare earth element, and a combination thereof, with $1 \leq w \leq 4$, $0 \leq x \leq 4$, $1 \leq y \leq 7$, and $2 \leq z \leq 30$.

According to various embodiments, M may be selected from the group consisting of Mg, Al, Fe, Zr, Ni, Sn, Zn, Ca, Na, K, and a combination thereof. The inorganic material can be selected from the group consisting of $Mg_2P_2O_7$, $AlPO_4$, and a combination thereof.

The inorganic material in the coating layer can include particles having an average particle diameter ranging from about 1 nm to about 1 μm. According to some embodiments, the inorganic material includes particles having an average particle diameter ranging from about 5 nm to about 500 nm. It is difficult for the inorganic material to have an average particle diameter of less than 1 nm, and when the average particle diameter is more than 1 μm, the coating layer effect can be impaired.

The lithium ion conductive polymer can be selected from the group consisting of polyvinylidene fluoride, a copolymer of polyvinylidene fluoride and hexafluoropropylene, poly(vinylacetate), poly(vinyl butyral-co-vinyl alcohol-co-vinyl acetate), poly(methylmethacrylate-co-ethyl acrylate), polyacrylonitrile, polyvinylchloride-co-vinyl acetate, polyvinyl alcohol, poly(1-vinylpyrrolidone-co-vinyl acetate), cellulose acetate, polyvinyl pyrrolidone, polyacrylate, polymethacrylate, polyolefins, polyurethanes, polyvinylethers, acrylonitrile-butadiene rubber, styrene-butadiene rubber, acrylonitrile-butadiene-styrene, a sulfonated styrene/ethylene-butylene/styrene triblock polymer, polyethylene oxide, polytetrafluoroethylene, a copolymer of polytetrafluoroethylene and hexafluoropropylene, and a combination thereof.

According to various embodiments, the lithium ion conductive polymer can be selected from the group consisting of polyvinylidene fluoride, a copolymer of polyvinylidene fluoride and hexafluoropropylene, and a combination thereof. The copolymer of polyvinylidene fluoride and hexafluoropropylene may include 98 to 84 mol % of polyvinylidene fluoride and 2 to 16 mol % of hexafluoropropylene. When hexafluoropropylene is included out of the range of 2 to 16 mol %, it may react with a solvent used to prepare a positive electrode, and may thereby not accomplish the effects that a copolymer of polyvinylidene fluoride and hexafluoropropylene lithium ion conductive polymer may bring about, and may degrade cell performance.

The lithium ion conductive polymer may have an average molecular weight ranging from about 40,000 to about 1,000,000. The lithium ion conductive polymer may have an average molecular weight ranging from about 90,000 to about 1,000,000. When the lithium ion conductive polymer has an average molecular weight of above 1,000,000, it may not accomplish desired effects, and may degrade cell performance.

The lithium ion conductive polymer may be mixed with the inorganic material in an appropriate ratio in the coating layer. The coating layer can have a thickness ranging from about 0.1 to about 30 μm. According to various embodiments, the coating layer has a thickness ranging from about 0.5 to about 20 μm. When the coating layer has a thickness of 0.1 μm or less, it may accomplish the desired effects. On the other hand, when the coating layer has a thickness of 30 μm or more, it may have too much resistance and degrade cell performance.

When the above electrode is a positive electrode, a positive active material of the positive electrode may be selected from the group consisting of compounds represented by Formulas 2 to 12 and mixtures thereof. The Formulas 2 to 12 are detailed below.

$$Li_{a1}Ni_{b1}Co_{c1}M1_{d1}O_2 \quad \text{Formula 2}$$

In Formula 2, $0.95 \leq a1 \leq 1.1$, $0 \leq b1 \leq 0.9$, $0 \leq c1 \leq 0.5$, $0 \leq d1 \leq 0.2$, $0.001 \leq d1 \leq 0.2$, and M1 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof.

$$Li_{a2}Ni_{b2}Co_{c2}Mn_{d2}M2_{e1}O_2 \quad \text{Formula 3}$$

In Formula 3, $0.95 \leq a2 \leq 1.1$, $0 \leq b2 \leq 0.9$, $0 \leq c2 \leq 0.5$, $0 \leq d2 \leq 0.5$, $0 \leq e1 \leq 0.2$, $0.001 \leq e1 \leq 0.2$, and M2 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof.

$$Li_{a3}Mn_2M3_{b3}O_4 \quad \text{Formula 4}$$

In Formula 4, $0.95 \leq a3 \leq 1.1$, $0 \leq b3 \leq 0.2$, $0.001 \leq b3 \leq 0.2$, and M3 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof.

$$GS_2 \quad \text{Formula 5}$$

In Formula 5, G is Ti or Mo.

$$LiJS_2 \quad \text{Formula 6}$$

In Formula 6, J is Ti or Mo.

$$V_2O_5 \quad \text{Formula 7}$$

$$LiV_2O_5 \quad \text{Formula 8}$$

$$LiKO_2 \quad \text{Formula 9}$$

In Formula 9, K is selected from the group consisting of Cr, V, Fe, Ti, Sc, Y, and a combination thereof.

$$LiNiVO_4 \quad \text{Formula 10}$$

$$Li_{(3-a4)}M'_2(PO_4)_3 \quad \text{Formula 11}$$

In Formula 11, $0 < a4 < 3$, M' is selected from the group consisting of V, Cr, Mn, Co, Ni, Cu, and a combination thereof.

$$Li_{(3-a7)}Fe_2(PO_4)_3 \quad \text{Formula 12}$$

In Formula 12, $0 \leq a \leq 2$.

When the above electrode is used in a negative electrode, a negative active material of the negative electrode may include at least one selected from the group consisting of a carbonaceous material, a lithium metal, a lithium alloy, a material being capable of forming a lithium-containing compound, and a combination thereof. According to some embodiments, the carbonaceous material may be appropriate for the negative active material.

The carbonaceous material may be amorphous carbon or crystalline carbon. The amorphous carbon may be a soft carbon (carbon obtained by sintering at a low temperature), a hard carbon (carbon obtained by sintering at a high temperature), mesophase pitch carbide, fired coke, and the like. The crystalline carbon may be unshaped, or sheet, flake, spherical, or fiber-shaped. The crystalline carbon may be natural or artificial graphite.

The carbonaceous material has an Lc (crystallite size) of at least 10 nm, as found through X-ray diffraction. According to various embodiments, the carbonaceous material has an Lc of about 10 to about 1500 nm, as found through X-ray diffraction. The carbonaceous material exhibits an exothermic peak at 700° C. or more. The exothermic peak differentiates crystalline and amorphous carbon. An exothermic peak above 700° C. indicates crystalline carbon, and therefore, the maximum value of the exothermic temperature need not be limited.

The crystalline carbon may be carbon prepared by carbonizing a material, for example, mesophase spherical particles, to produce a carbonized material. The carbonized material can then be graphitized in a graphitizing operation. The carbonized material may be a graphite fiber, prepared by carbonizing a mesophase pitch fiber and graphitizing the carbonized mesophase pitch fiber.

The lithium alloy includes lithium and a metal selected from the group consisting of Na, K, Rb, Cs, Fr, Be, Mg, Ca, Sr, Ba, Ra, Al, and Sn.

The material being capable of forming a lithium-containing compound, by reaction with lithium ions, includes tin oxide ($SnO_2$), titanium nitrate, silicon (Si), and the like, but is not limited thereto.

A current collector of the positive electrode can be an aluminum foil. A current collector of the negative electrode can be copper foil. The current collectors are not limited thereto, as any suitable current collector material can be used.

The electrode can include a binder along with the above-described active material. The binder binds active material particles, positive active materials, and/or the current collector. Examples of binders include, but are not limited to, polyvinylalcohol, carboxylmethylcellulose, hydroxypropylcellulose, diacetylenecellulose, polyvinylchloride, polyvinylpyrrolidone, polytetrafluoroethylene, polyvinylidene fluoride, polyethylene, and polypropylene.

When the electrode is a positive electrode, a conductive agent can optionally be included. When the electrode is a negative electrode, a conductive agent can optionally be included. Any electrically conductive material, having an electrical conductivity and a chemical stability, may be used as the conductive material. Examples of suitable conductive materials include: natural graphite; artificial graphite; carbon black; acetylene black; ketjen black; carbon fiber; metal powder; or a metal fiber including copper, nickel, aluminum, silver, and the like; a polyphenylene derivative, or a combination thereof.

The electrode may be fabricated by preparing an active material composition by mixing an active material, a binder, optionally a conductive agent, and a first solvent. The composition is applied onto a current collector, to form an active material layer. A coating layer composition, including a lithium ion conductive polymer, an inorganic material of the above Formula 1, and a second solvent, is coated on the active material layer, to form a coating layer.

The first solvent may be any solvent that has been used during the formation of the active material layer. For example, N-methylpyrrolidone may be used, but the present teachings are not limited thereto. The second solvent may include acetone, N-methylpyrrolidone, or cyclohexanone.

The active material composition and coating layer composition may be applied in accordance with a conventional method, such as, a method using a doctor blade, slurry coating, or the like.

FIG. 1 shows a schematic structure of an electrode 20. The electrode 20 includes a current collector 10, an active material layer 12 disposed on the current collector 10, and a coating layer 14 disposed on the active material layer 12. The electrode 20 may be used as a positive and/or a negative electrode, of a rechargeable lithium battery.

Figure 2:
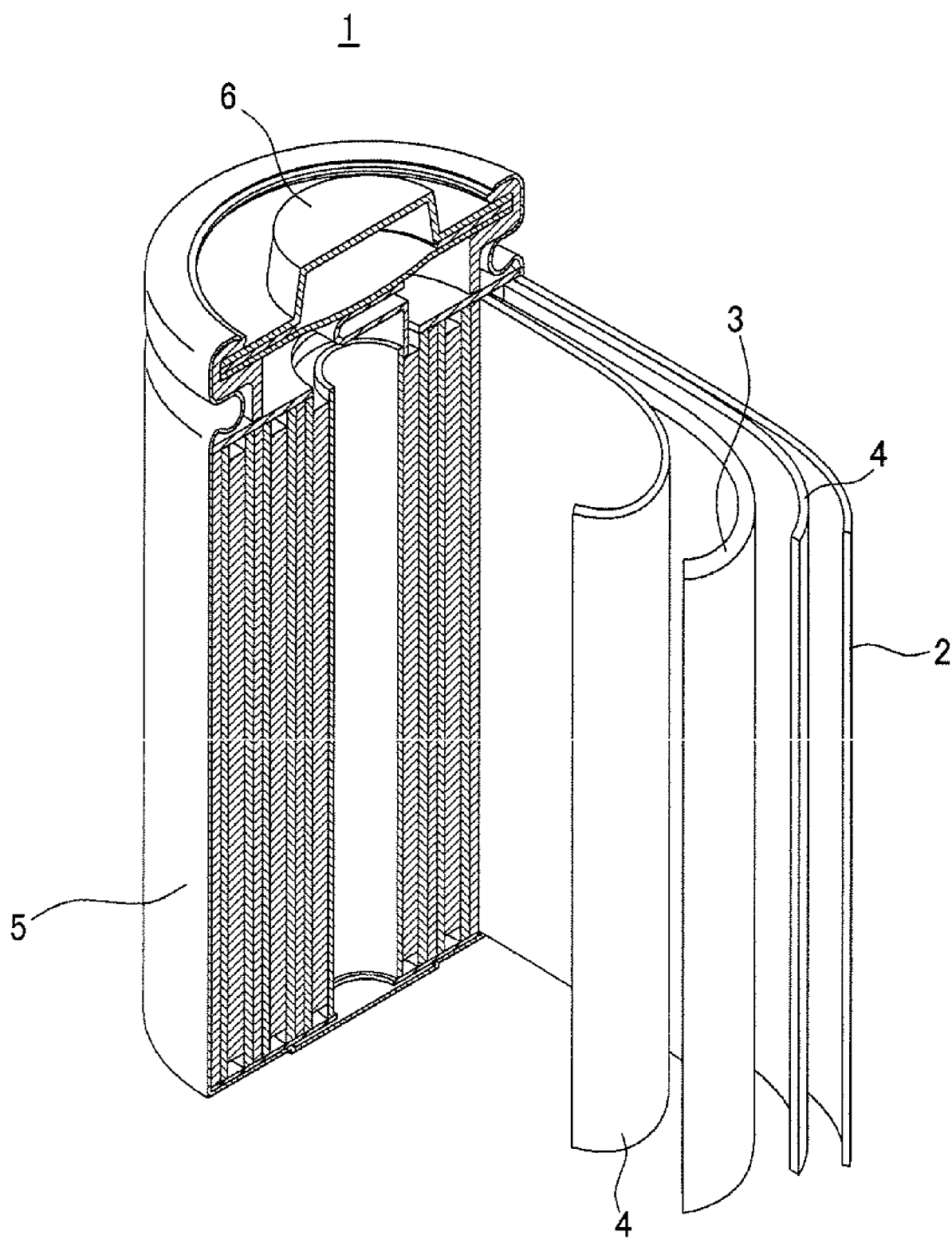
FIG. 2 is a schematic view of a rechargeable lithium battery, according to various embodiments of the present invention.

FIG. 2 is a schematic cross-sectional view of a rechargeable lithium battery 1, according to various embodiments. The rechargeable lithium battery 1 includes a negative electrode 2, a positive electrode 3, a separator 4 interposed between the positive electrode 3 and the negative electrode 2, and an electrolyte in which the separator 4 is immersed. The rechargeable lithium battery 1 also includes a cell case 5 and a sealing member 6 to seal the cell case 5.

The electrolyte can be a non-aqueous organic solvent and a lithium salt. The non-aqueous organic solvent acts as a medium for transmitting ions taking part in the electrochemical reactions in the battery. The positive electrode 3 and/or the negative electrode 2 can be the electrode 20.

The non-aqueous organic solvent may be a solvent that is carbonate-based, ester-based, ether-based, ketone-based, alcohol-based, or aprotic. Examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Examples of the ester-based solvent include n-methyl acetate, n-ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like. Examples of the ketone-based solvent include cyclohexanone, and the like. Examples of the alcohol-based solvent include ethyl alcohol, isopropyl alcohol, and the like. Examples of the aprotic solvent include nitriles such as X—CN (wherein, R is a C2 to C20 linear, branched, or cyclic hydrocarbon, a double bond, an aromatic ring, or an ether bond), amides, such as, dimethylform amide, dioxolanes, such as, 1,3-dioxolane, sulfolanes, and the like.

The non-aqueous organic solvent may be used singularly or in a mixture. When the organic solvent is used in a mixture, the mixture ratio may be controlled in accordance with a desired battery performance.

The carbonate-based solvent may include a mixture of a cyclic carbonate and a linear carbonate. The cyclic carbonate and the linear carbonate are mixed together in a volume ratio of about 1:1 to about 1:9. When the mixture is used as an electrolyte, the electrolyte performance may be enhanced. The electrolyte may further include mixtures of carbonate-based solvents and aromatic hydrocarbon-based solvents. The carbonate-based solvents and the aromatic hydrocarbon-based solvents can be mixed together in a volume ratio of about 1:1 to about 30:1.

The aromatic hydrocarbon-based organic solvent may be represented by Formula 13.

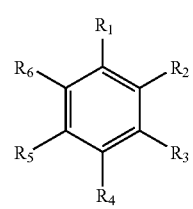

Formula 13 wherein $R_1$ to $R_6$ are independently selected from the group consisting of hydrogen, a halogen, a C1 to C10 alkyl, a haloalkyl, and a combination thereof.

The aromatic hydrocarbon-based organic solvent may include, but is not limited to, one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further include an overcharge inhibition additive, such as, ethylene carbonate, pyrocarbonate, and the like.

The lithium salt is dissolved in the non-aqueous organic solvent, to supply lithium ions in the battery. The lithium salt facilitates the transmission of lithium ions between the positive and negative electrodes. Non-limiting examples of the lithium salt include a supporting electrolyte salt selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, lithium bisoxalate borate, and a combination thereof. The lithium salt may be used at a concentration of about 0.1 to about 2.0M. When the lithium salt concentration is less than about 0.1M, the performance of the electrolyte may deteriorate, due to low electrolyte conductivity. When the concentration is more than about 2.0M, lithium ion mobility may be reduced, due to an increase of electrolyte viscosity.

A rechargeable lithium battery generally includes a positive electrode, a negative electrode, and an electrolyte. The battery may further include a separator, as needed. The separator may include any material used in conventional lithium secondary batteries. Non-limiting examples of suitable separator materials include polyethylene, polypropylene, polyvinylidene fluoride, and multi-layers thereof, such as, a polyethylene/polypropylene double-layered separator, a polyethylene/polypropylene/polyethylene triple-layered separator, and a polypropylene/polyethylene/polypropylene triple-layered separator.

Rechargeable lithium batteries may be classified as lithium ion batteries, lithium ion polymer batteries, and lithium polymer batteries, according to the presence of a separator and the kind of electrolyte used in the battery. Rechargeable lithium batteries may have a variety of shapes and sizes, including cylindrical, prismatic, and coin-type. Rechargeable lithium batteries may be thin-film batteries or may be rather bulky in size. Structures and fabricating methods for lithium ion batteries are well known in the art.

The following examples illustrate the aspects of present invention in more detail. These examples, however, should not in any sense be interpreted as limiting the scope of the present invention.

EXAMPLE 1

A $LiCoO_2$ positive active material, a polyvinylidene fluoride binder, and a super-P conductive agent were mixed in a ratio of 96:2:2 wt %, in an N-methylpyrrolidone solvent, to prepare a positive active material slurry. The positive active material slurry was coated on an aluminum current collector, and then dried and compressed, to form a positive active material layer on a current collector.

A coating layer composition was prepared by mixing a copolymer of polyvinylidene fluoride and hexafluoropropylene and $AlPO_4$, in a ratio of 90:10 wt %, in an acetone solvent. The coating layer composition was coated on the positive active material and dried, to form a coating layer. The coating layer had a thickness of 0.1 μm, and the $AlPO_4$ had an average particle diameter of 20 nm.

According to the above process, a positive electrode was prepared to include a current collector, a positive active material layer, and a coating layer.

An artificial graphite negative active material and a polyvinylidene fluoride binder were mixed in a ratio of 94:6 wt %, in an N-methylpyrrolidone solvent, to prepare a negative active material slurry. The slurry was coated on a copper current collector, then dried and compressed, to fabricate a negative electrode. The graphite negative active material had an Lc of about 100 nm, as measured by X-ray diffraction. The graphite negative active material showed an exothermic peak at 700° C. or higher.

1.3M of $LiPF_6$ was dissolved in a mixed solvent of ethylene carbonate, dimethyl carbonate, and ethylmethyl carbonate, in a volume ratio of 30:30:40, to prepare an electrolyte solution.

A rechargeable lithium battery cell was fabricated using the above positive electrode, negative electrode, and electrolyte, according to a conventional method.

EXAMPLE 2

A rechargeable lithium battery cell was fabricated, according to the same method as in Example 1, except that the thickness of an $AlPO_4$ coating layer was changed to 0.1 μm.

EXAMPLE 3

A rechargeable lithium battery cell was fabricated, according to the same method as in Example 1, except that the thickness of an $AlPO_4$ coating layer was changed to 1 μm.

EXAMPLE 4

A rechargeable lithium battery cell was fabricated, according to the same method as in Example 1, except that the thickness of an $AlPO_4$ coating layer was changed to 3 μm.

EXAMPLE 5

A rechargeable lithium battery cell was fabricated, according to the same method as in Example 1, except that the thickness of an $AlPO_4$ coating layer was changed to 5 μm.

EXAMPLE 6

A rechargeable lithium battery cell was fabricated, according to the same method as in Example 1, except that the thickness of an $AlPO_4$ coating layer was changed to 10 μm.

EXAMPLE 7

A rechargeable lithium battery cell was fabricated according to the same method as in Example 1, except that the thickness of an $AlPO_4$ coating layer was changed to 20 μm.

EXAMPLE 8

A rechargeable lithium battery cell was fabricated, according to the same method as in Example 1, except that the thickness of an $AlPO_4$ coating layer was changed to 30 μm.

EXAMPLE 9

A rechargeable lithium battery cell was fabricated, according to the same method as in Example 1, except that a 1 μm-thick $Mg_2P_2O_7$ coating layer was formed.

EXAMPLE 10

A rechargeable lithium battery cell was fabricated, according to the same method as in Example 1, except that a 3 μm-thick $Mg_2P_2O_7$ coating layer was formed.

EXAMPLE 11

A rechargeable lithium battery cell was fabricated, according to the same method as in Example 1, except that a 5 μm-thick $Mg_2P_2O_7$ coating layer was formed.

EXAMPLE 12

A rechargeable lithium battery cell was fabricated, according to the same method as in Example 1, except that a 10 μm-thick $Mg_2P_2O_7$ coating layer was formed.

EXAMPLE 13

A rechargeable lithium battery cell was fabricated, according to the same method as in Example 1, except that a 20 μm-thick $Mg_2P_2O_7$ coating layer was formed.

EXAMPLE 14

A rechargeable lithium battery cell was fabricated, according to the same method as in Example 1, except that a 30 μm-thick $Mg_2P_2O_7$ coating layer was formed.

COMPARATIVE EXAMPLE 1

A $LiCoO_2$ positive active material, a polyvinylidene fluoride binder, and a Super-P conductive agent were mixed in a ratio of 96:2:2 wt %, in a N-methylpyrrolidone solvent, to prepare a positive active material slurry. The positive active material slurry was coated on an aluminum current collector, and then dried and compressed, to fabricate a positive electrode.

An artificial graphite negative active material and a polyvinylidene fluoride binder were mixed in a ratio of 94:6 wt %, in an N-methylpyrrolidone solvent, to prepare a negative active material slurry. The negative active material slurry was coated on a copper current collector, then dried and compressed, to fabricate a negative electrode. The graphite negative active material had an Lc of about 100 nm, as measured by X-ray diffraction, and the graphite negative active material showed an exothermic peak at 700° C. or higher.

1.3M of $LiPF_6$ was dissolved in a mixed solvent of ethylene carbonate, dimethyl carbonate, and ethylmethyl carbonate, in a volume ratio of 30:30:40, to prepare an electrolyte solution.

A rechargeable lithium battery cell was fabricated using the above positive electrode, negative electrode, and electrolyte, according to a conventional method.

18650 cylindrical rechargeable lithium battery cells, according to Examples 1 to 14, and Comparative Example 1, were charged at 0.2C and then discharged at 0.2C, for a formation charge and discharge, and then charged at 0.5C and discharged at 0.2C, for a standard charge and discharge. All the discharge capacities, at a third cycle of the standard charge and discharge, were measured to be 2800 mAh.

The battery cells were charged at 1.0C and discharged at 1.0C, and then 300th cycle discharge capacities at 60° C. were measured, to evaluate cycle-life characteristics. The measurement results are shown in the following Tables 1 and 2. The cycle-life measurement results in Tables 1 and 2 refer to a ratio of the $300^{th}$ cycle discharge capacity, relative to a first cycle discharge capacity.

The battery cells were charged to 4.35V and were penetration tested. The results are shown in the following Table 1. Then, the battery cells were over-charged to 4.45V, and were penetration tested. The results are also shown in the following Table 1.

Furthermore, the battery cells were examined for thermal stability, by separating an electrode after charging to 4.5V, sampling 1.5 mg of an active material coated on the Al foil, then putting the electrode in an aluminum sample and completely sealing it, to perform a DSC analysis. The results of the exothermic flow levels are shown in Table 1.

TABLE 1

| | Inorganic material | Coating thickness (μm) | Penetration test | Penetration test after overcharge | 300th cycle-life at 60° C. | Exothermic level (W/g) |
|---|---|---|---|---|---|---|
| Comparative Example 1 | — | — | Fired | Fired | 42 | 30.2 |
| Example 1 | $AlPO_4$ | 0.05 | Unfired | Unfired | 49 | 10.2 |
| Example 2 | | 0.1 | Unfired | Unfired | 57 | 7.2 |
| Example 3 | | 1 | Unfired | Unfired | 58 | 5.1 |
| Example 4 | | 3 | Unfired | Unfired | 65 | 4.8 |
| Example 5 | | 5 | Unfired | Unfired | 63 | 4.6 |
| Example 6 | | 10 | Unfired | Unfired | 55 | 3.2 |
| Example 7 | | 20 | Unfired | Unfired | 51 | 2.0 |
| Example 8 | | 30 | Unfired | Unfired | 40 | 1.5 |
| Example 9 | $Mg_2P_2O_7$ | 1 | Unfired | Unfired | 62 | 2.1 |
| Example 10 | | 3 | Unfired | Unfired | 67 | 1.8 |
| Example 11 | | 5 | Unfired | Unfired | 68 | 1.7 |
| Example 12 | | 10 | Unfired | Unfired | 61 | 1.5 |
| Example 13 | | 20 | Unfired | Unfired | 57 | 1.0 |
| Example 14 | | 30 | Unfired | Unfired | 49 | 0.8 |

As shown in Table 1, since the battery cells of Examples 1 to 14 included a positive electrode disposed with a coating layer including a lithium ion conductive polymer and an inorganic material, they were not fired (burned) during the penetration test and the overcharge penetration test. Accordingly, Examples 1 to 14 had much better safety characteristics than Comparative Example 1. In addition, Examples 1 to 14 had much better cycle-life characteristics, at a high temperature (60° C.), than Comparative Example 1. Furthermore, Examples 1 to 14 had lower exothermic levels than Comparative Example 1, thereby demonstrating excellent thermal stability.

COMPARATIVE EXAMPLE 2

A positive active material was prepared by coating $LiCoO_2$ with an $AlPO_4$ solution (solvent: acetone). The $AlPO_4$ was coated in an amount of 0.1 wt %, based on the entire weight of the positive active material. A rechargeable lithium battery was fabricated, according to the same method as in Comparative Example 1, except that the positive active material was used.

COMPARATIVE EXAMPLE 3

A rechargeable lithium battery was fabricated, according to the same method as in as Comparative Example 1, except that a positive active material coated with $Mg_2P_2O_7$ was used instead of $AlPO_4$.

COMPARATIVE EXAMPLE 4

A $LiCoO_2$ positive active material, a polyvinylidene fluoride binder, and a Super-P conductive agent were mixed in a ratio of 96:2:2 wt %, in an N-methylpyrrolidone solvent, to prepare a positive active material slurry. The positive active material slurry was coated on an aluminum current collector, and then dried and compressed, to form a positive active material layer on a current collector.

An $AlPO_4$ coating layer solution (solvent: acetone) was coated on the positive active material layer and dried, forming a coating layer. The coating layer had a thickness of 3 μm, and the $AlPO_4$ had an average particle diameter of 20 nm.

According to the above process, a positive electrode was prepared to include a current collector, a positive active material layer, and a coating layer.

An artificial graphite negative active material and a polyvinylidene fluoride binder were mixed in a ratio of 94:6 wt %, in an N-methylpyrrolidone solvent, to prepare a negative active material slurry. The slurry was coated on a copper current collector, then dried and compressed, to fabricate a negative electrode. The graphite negative active material had an Lc of about 100 nm, as measured by X-ray diffraction, and the graphite negative active material showed an exothermic peak at 700° C. or higher.

1.3M of $LiPF_6$ was dissolved in a mixed solvent of ethylene carbonate, dimethyl carbonate, and ethylmethyl carbonate in a volume ratio of 30:30:40, to prepare an electrolyte solution.

A rechargeable lithium battery cell was fabricated using the above positive electrode, negative electrode, and electrolyte, according to a conventional method.

COMPARATIVE EXAMPLE 5

A rechargeable lithium battery was fabricated, according to the same method as in Comparative Example 4, except that a positive active material, coated with $Mg_2P_2O_7$, was used instead of $AlPO_4$.

The battery cells according to Comparative Examples 2 to 5 were charged to the cut-off voltage of 4.35V at 60° C. and were then continuously charged while maintaining a voltage of 4.35V. The results are shown in the following Table 2. The continuous charging time, at 4.35V and at high temperature, was measured to evaluate a trickle charging time, a time at which a current is sharply increased during the continuous charging.

TABLE 2

|  | Continuous charging time at a high temperature (Hr) |
|---|---|
| Comparative Example 2 | 31 |
| Comparative Example 3 | 35 |
| Comparative Example 5 | 71 |
| Comparative Example 6 | 75 |

As shown in Table 2, the battery cells according to Comparative Examples 5 and 6, where an $AlPO_4$ or $Mg_2P_2O_7$ inorganic material was coated on the positive active material layer, showed a longer continuous charging time at a high temperature, than the battery cells according to Comparative Examples 2 and 3, where an $AlPO_4$ or $Mg_2P_2O_7$ inorganic materials were coated on the positive active material. Accordingly, $AlPO_4$ or $Mg_2P_2O_7$ may have better effects when coated on a substrate, that is, on an active material layer, than when coated on a positive active material.

In addition, rechargeable lithium batteries, according to Examples 4 and 9 and Comparative Examples 4 and 5, were charged at 1.0C and discharged at 1.0C, 50 times, and examined regarding the cycle-life characteristic at room temperature (25° C.), to determine if a coating, including a polymer as well as an inorganic material, would have better effects than a coating only including an inorganic material. As shown in Table 3, the cycle-life characteristic results indicate a ratio of charge capacity at the first cycle vs. discharge capacity at the 50th cycle.

TABLE 3

|  | $50^{th}$ cycle-life at a room temperature (%) |
|---|---|
| Comparative Example 4 | 58 |
| Comparative Example 5 | 62 |
| Example 4 | 92 |
| Example 10 | 93 |

As shown in Table 3, rechargeable lithium batteries according to Examples 4 and 10, where their coating layer included a lithium ion conductive polymer as well as an inorganic material, had much better cycle-life characteristics at room temperature, than Comparative Examples 4 and 5, where the coating layer included only an inorganic material.

Based on the results in Tables 2 and 3, coating an inorganic material (active material layer) on a substrate, may be more effective than coating the inorganic material on a positive active material. When the inorganic material is coated with a lithium ion conductive polymer, it may be more effective.

As described above, an electrode for a rechargeable lithium battery includes a coating layer, including an inorganic material and a lithium ion conductive polymer disposed on an active material layer. Such a rechargeable battery may excellent safety, thermal stability, and cycle-life characteristics.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electrode for a rechargeable lithium battery, comprising:
   a current collector;
   an active material layer disposed on the current collector; and
   a coating layer disposed on the active material layer and including a lithium ion conductive polymer and an inorganic material comprising $Mg_2P_2O_7$.

2. The electrode of claim 1, wherein the lithium ion conductive polymer is selected from the group consisting of polyvinylidene fluoride, a copolymer of polyvinylidene fluoride and hexafluoropropylene, poly(vinylacetate), poly(vinyl butyral-co-vinyl alcohol-co-vinyl acetate), poly(methylmethacrylate-co-ethyl acrylate), polyacrylonitrile, polyvinylchloride-co-vinyl acetate, polyvinyl alcohol, poly(1-vinylpyrrolidone-co-vinyl acetate), cellulose acetate, polyvinyl pyrrolidone, polyacrylate, polymethacrylate, polyolefins, polyurethanes, polyvinylethers, acrylonitrile-butadiene rubber, styrene-butadiene rubber, acrylonitrile-butadiene-styrene, a sulfonated styrene/ethylene-butylene/styrene triblock polymer, polyethylene oxide, polytetrafluoroethylene, a copolymer of polytetrafluoroethylene and hexafluoropropylene, and a combination thereof.

3. The electrode of claim 2, wherein the lithium ion conductive polymer is selected from the group consisting of polyvinylidene fluoride, a copolymer of polyvinylidene fluoride and hexafluoropropylene, and a combination thereof.

4. The electrode of claim 1, wherein the coating layer has a thickness ranging from about 0.1 to about 30 μm.

5. The electrode of claim 1, wherein the coating layer has a thickness ranging from about 0.5 to about 20 μm.

6. The electrode of claim 1, wherein the inorganic material has an average particle diameter ranging from about 1 nm to about 1 μm.

7. The electrode of claim 6, wherein the inorganic material has an average particle diameter ranging from about 5 nm to about 500 nm.

8. The electrode of claim 1, wherein:
   the active material is a positive active material selected from the group consisting of compounds represented by Formulas 2 to 12, and a combination thereof;
   Formula 2 is $Li_{a1}Ni_{b1}Co_{c1}M1_{d1}O_2$,
      wherein $0.95 \leq a1 \leq 1.1$, $0 \leq b1 \leq 0.9$, $0 \leq c1 \leq 0.5$, $0 \leq d1 \leq 0.2$, and M1 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof and wherein b1, c1, and d1 are not simultaneously 0;
   Formula 3 is $Li_{a2}Ni_{b2}Co_{c2}Mn_{d2}M2_{e1}O_2$,
      wherein $0.95 \leq a2 \leq 1.1$, $0 \leq b2 \leq 0.9$, $0 \leq c2 \leq 0.5$, $0 \leq d2 \leq 0.5$, $0 \leq e1 \leq 0.2$, and M2 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof and wherein b2, c2, d2, and e1 are not simultaneously 0;
   Formula 4 is $Li_{a3}Mn_2M3_{b3}O_4$,
      wherein $0.95 \leq a3 \leq 1.1$, $0 \leq b3 \leq 0.2$, and M3 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof;
   Formula 5 is $GS_2$,
      wherein G is selected from the group consisting of Ti and Mo;
   Formula 6 is $LiJS_2$,
      wherein J is selected from the group consisting of Ti and Mo;
   Formula 7 is $V_2O_5$;
   Formula 8 is $LiV_2O_5$;
   Formula 9 is $LiKO_2$,
      wherein K is selected from the group consisting of Cr, V, Fe, Ti, Sc, Y, and a combination thereof;
   Formula 10 is $LiNiVO_4$;
   Formula 11 is $Li_{(3-a4)}M'_2(PO_4)_3$,
      wherein $0 < a4 < 3$, M' is selected from the group consisting of V, Cr, Mn, Co, Ni, Cu, and a combination thereof; and
   Formula 12 is $Li_{(3-a')}Fe_2(PO_4)_3$,
      wherein $0 \leq a' \leq 2$.

9. The electrode of claim 8, wherein in Formula 2, the d1 is in a range of $0.001 \leq d1 \leq 0.2$.

10. The electrode of claim 8, wherein in Formula 3 the e1 is in a range of $0.001 \leq e1 \leq 0.2$.

11. The electrode of claim 8, wherein in Formula 4 the b3 is in a range of $0.001 \leq b3 \leq 0.2$.

12. The electrode of claim 1, wherein the active material is a negative active material selected from the group consisting of a carbonaceous material, a lithium metal, a lithium alloy, a material being capable of forming a lithium-containing compound, and a combination thereof.

13. The electrode of claim 12, wherein the negative active material is a carbonaceous material.

14. The electrode of claim 13, wherein the carbonaceous material has an Lc (crystallite size) of at least 10 nm found through X-ray diffraction, and has an exothermic peak of at least 700° C.

15. The electrode of claim 13, wherein the carbonaceous material is selected from the group consisting of a carbon prepared by carbonizing mesophase spherical particles and graphitizing the carbonized mesophase spherical particles, and a graphite fiber prepared by carbonizing a mesophase pitch fiber and graphitizing the carbonized mesophase pitch fiber.

16. A rechargeable lithium battery comprising:
   a positive electrode;
   a negative electrode; and
   a non-aqueous electrolyte comprising a non-aqueous organic solvent and a lithium salt, wherein at least one of the positive and negative electrodes comprises:
   a current collector;
   an active material layer disposed on the current collector; and
   a coating layer disposed on the active material layer and comprising a lithium ion conductive polymer and an inorganic material comprising $Mg_2P_2O_7$.

17. The rechargeable lithium battery of claim 16, wherein the lithium ion conductive polymer is selected from the group consisting of polyvinylidene fluoride, a copolymer of polyvinylidene fluoride and hexafluoropropylene, poly(vinylacetate), poly(vinyl butyral-co-vinyl alcohol-co-vinyl acetate), poly(methylmethacrylate-co-ethyl acrylate), polyacrylonitrile, polyvinylchloride-co-vinyl acetate, polyvinyl alcohol, poly(1-vinylpyrrolidone -co-vinyl acetate), cellulose acetate, polyvinyl pyrrolidone, polyacrylate, polymethacrylate, polyolefins, polyurethanes, polyvinylethers, acrylonitrile-butadiene rubber, styrene-butadiene rubber, acrylonitrile-butadiene-styrene, a sulfonated styrene/ethylene-butylene/styrene triblock polymer, polyethylene oxide, polytetrafluoroethylene, a copolymer of polytetrafluoroethylene and hexafluoropropylene, and a combination thereof.

18. The rechargeable lithium battery of claim 17, wherein the lithium ion conductive polymer is selected from the group consisting of polyvinylidene fluoride, a copolymer of polyvinylidene fluoride and hexafluoropropylene, and a combination thereof.

19. The rechargeable lithium battery of claim 16, wherein the coating layer has a thickness ranging from about 0.1 to about 30 μm.

20. The rechargeable lithium battery of claim 16, wherein the coating layer has a thickness ranging from about 0.5 to about 20 μm.

21. The rechargeable lithium battery of claim 16, wherein the inorganic material has an average particle diameter ranging from about 1 nm to about 1 μm.

22. The rechargeable lithium battery of claim 21, wherein the inorganic material has an average particle diameter ranging from about 5 nm to about 500 nm.

23. The rechargeable lithium battery of claim 16, wherein:
the active material is a positive active material selected from the group consisting of compounds represented by Formulas 2 to 12, and a combination thereof;
Formula 2 is $Li_{a1}Ni_{b1}Co_{c1}M1_{d1}O_2$,
wherein $0.95 \leq a1 \leq 1.1$, $0 \leq b1 \leq 0.9$, $0 \leq c1 \leq 0.5$, $0 \leq d1 \leq 0.2$, and M1 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof and wherein b1, c1, and d1 are not simultaneously 0;
Formula 3 is $Li_{a2}Ni_{b2}Co_{c2}Mn_{d2}M2_{e1}O_2$,
wherein $0.95 \leq a2 \leq 1.1$, $0 \leq b2 \leq 0.9$, $0 \leq c2 \leq 0.5$, $0 \leq d2 \leq 0.5$, $0 \leq e1 \leq 0.2$, and M2 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof and wherein b2, c2, d2, and e1 are not simultaneously 0;
Formula 4 is $Li_{a3}Mn_2M3_{b3}O_4$,
wherein $0.95 \leq a3 \leq 1.1$, $0 \leq b3 \leq 0.2$, and M3 is selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Ru, Os, Hs, Rh, Ir, Pd, Pt, Cu, Ag, Au, Zn, Cd, B, Al, Ga, In, Tl, Si, Ge, Sn, P, As, Sb, Bi, S, Se, Te, Po, and a combination thereof;
Formula 5 is $GS_2$,
wherein G is selected from the group consisting of Ti and Mo;
Formula 6 is $LiJS_2$,
wherein J is selected from the group consisting of Ti and Mo;
Formula 7 is $V_2O_5$;
Formula 8 is $LiV_2O_5$;
Formula 9 is $LiKO_2$,
wherein K is selected from the group consisting of Cr, V, Fe, Ti, Sc, Y, and a combination thereof;
Formula 10 is $LiNiVO_4$;
Formula 11 is $Li_{(3-a4)}M'_2(PO_4)_3$,
wherein, $0<a4<3$, M' is selected from the group consisting of V, Cr, Mn, Co, Ni, Cu, and a combination thereof; and
Formula 12 is $Li_{(3-a')}Fe_2(PO_4)_3$,
wherein $0 \leq a' \leq 2$.

24. The rechargeable lithium battery of claim 23, wherein in Formula 2, the d1 is in a range of $0.001 \leq d1 \leq 0.2$.

25. The rechargeable lithium battery of claim 23, wherein in Formula 3 the e1 is in a range of $0.001 \leq e1 \leq 0.2$.

26. The rechargeable lithium battery of claim 23, wherein in Formula 4 the b3 is in a range of $0.001 \leq b3 \leq 0.2$.

27. The rechargeable lithium battery of claim 16, wherein the active material is a negative active material selected from the group consisting of a carbonaceous material, a lithium metal, a lithium alloy, a material to form a lithium-containing compound, and a combination thereof.

28. The rechargeable lithium battery of claim 27, wherein the negative active material is a carbonaceous material.

29. The rechargeable lithium battery of claim 28, wherein the carbonaceous material has an Lc (crystallite size) of at least 10 nm found through X-ray diffraction and has an exothermic peak of at least 700° C.

30. The rechargeable lithium battery of claim 28, wherein the carbonaceous material is selected from the group consisting of a carbon prepared by carbonizing mesophase spherical particles and graphitizing the carbonized mesophase spherical particles, and a graphite fiber prepared by carbonizing a mesophase pitch fiber and graphitizing the carbonized mesophase pitch fiber.

31. The rechargeable lithium battery of claim 16, wherein the non-aqueous organic solvent is selected from the group consisting of a carbonate-based solvent, an ester-based solvent, an ether-based solvent, a ketone-based solvent, an alcohol-based solvent, and an aprotic solvent.

32. The rechargeable lithium battery of claim 16, wherein the lithium salt is a supporting electrolyte salt selected from the group consisting of $LiPF_6$, $LiBF_4$, $LiSbF_6$, $LiAsF_6$, $LiCF_3SO_3$, $LiN(SO_2C_2F_5)_2$, $LiN(CF_3SO_2)_2$, $LiC_4F_9SO_3$, $LiClO_4$, $LiAlO_4$, $LiAlCl_4$, $LiN(C_xF_{2x+1}SO_2)(C_yF_{2y+1}SO_2)$ (where x and y are natural numbers), LiCl, LiI, lithium bisoxalate borate, and a combination thereof.

33. The rechargeable lithium battery of claim 16, wherein the lithium salt is included in a concentration of about 0.1 to about 2.0M.

* * * * *